United States Patent [19]

Barkey

[11] 4,217,440

[45] Aug. 12, 1980

[54] METHOD FOR MAKING BRANCHED POLYESTERS REPRODUCIBLY

[75] Inventor: Kenneth T. Barkey, Rochester, N.Y.

[73] Assignee: Eastman Kodak Company, Rochester, N.Y.

[21] Appl. No.: 68,035

[22] Filed: Aug. 20, 1979

[51] Int. Cl.$^3$ .................... C08G 63/04; C08G 63/22
[52] U.S. Cl. .................................. 528/274; 528/296; 528/299
[58] Field of Search ........................ 528/274, 296, 299

[56] References Cited

U.S. PATENT DOCUMENTS

| | | |
|---|---|---|
| 3,576,773 | 4/1971 | Vaginay . |
| 3,668,187 | 6/1972 | King et al. . |
| 4,013,624 | 3/1977 | Hoeschele . |

FOREIGN PATENT DOCUMENTS 1027613  4/1966  United Kingdom .

Primary Examiner—Lucille M. Phynes
Attorney, Agent, or Firm—J. Lanny Tucker

[57] ABSTRACT

A method for preparing branched polyesters in melt or solid phase comprises reacting together diols, diacids and polyfunctional modifiers having at least three functional radicals to form a condensation polymer. This condensation polymer is polycondensed to form a polyester by linear extension and branching while correlating catalyst activity, reaction temperature and pressure to restrain the extent of reaction for linear extension to within about 0.1 percent of the extent of reaction for branching.

20 Claims, 2 Drawing Figures

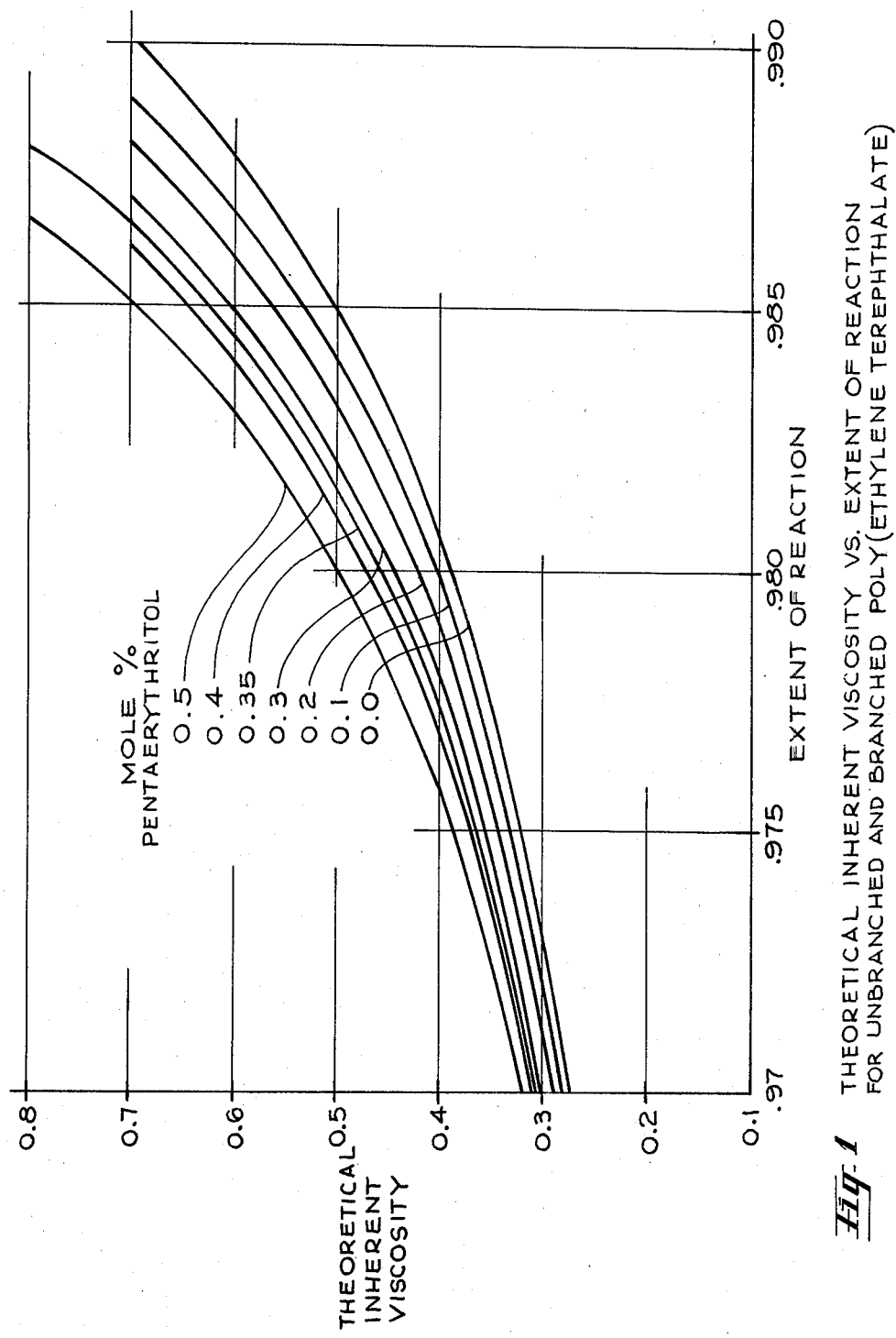
Fig. 1 THEORETICAL INHERENT VISCOSITY VS. EXTENT OF REACTION FOR UNBRANCHED AND BRANCHED POLY(ETHYLENE TEREPHTHALATE)

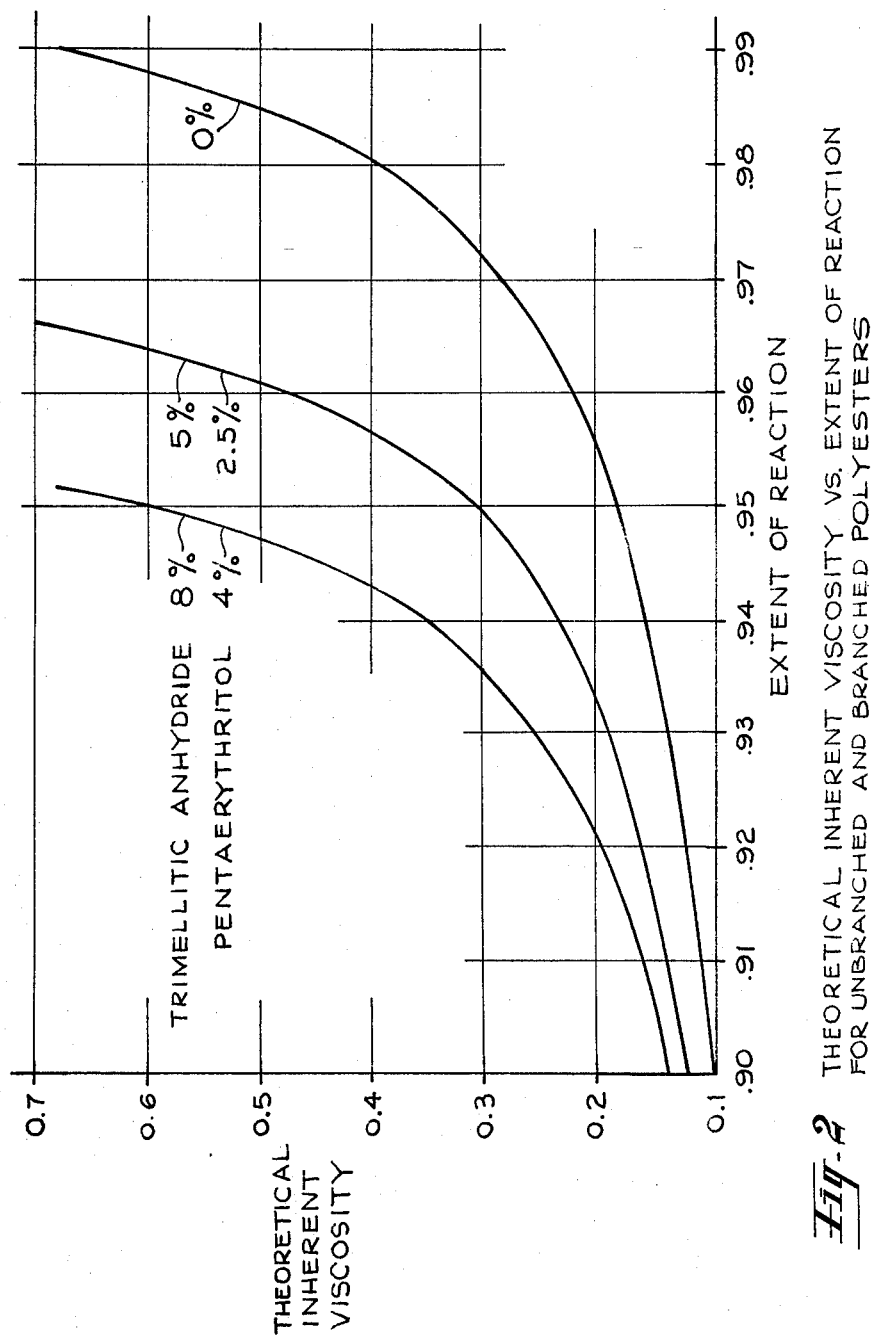
Fig. 2 THEORETICAL INHERENT VISCOSITY VS. EXTENT OF REACTION FOR UNBRANCHED AND BRANCHED POLYESTERS

METHOD FOR MAKING BRANCHED POLYESTERS REPRODUCIBLY

FIELD OF THE INVENTION

This invention relates to a method of preparing branched polyesters. In particular, this invention provides a method of reproducing a branched polyester having a pre-selected combination of properties for a specific use.

BACKGROUND OF THE INVENTION

Polyesters can be modified during their preparation with polyfunctional modifiers to obtain branched polyesters having particular chemical or physical properties. These polyfunctional modifiers are also known as branching agents. These modifiers generally have different molecular weights, volatilities, chemical reactivities and other properties. In the prior art, when a polyester is modified with a polyfunctional modifier to form a branched polyester, it appears that no attempt is made to insure that all of the modifier reacts to the same degree each time a batch of polyester is made. As a result, the amount of modifier incorporated into the branched polyester varies from batch to batch.

Branched polyesters are known to be useful in a variety of products. However, practical manufacture of branched polyesters has been hindered because it is difficult to consistently reproduce such polyesters from one batch to another using prior art methods. Prior art methods do produce ways for preparing branched polyesters having the same or similar inherent viscosities. However, branched polyesters having the same or similar inherent viscosities do not necessarily have the same physical or chemical properties. For example, I have observed that two branched polyesters which are prepared from the same materials and have the same inherent viscosity can have such different physical and chemical properties, due to different amounts of branching, that one polyester is suitable for use as a film support while the other is not.

It is well known that the inherent viscosity actually measured for a branched polyester is really an "overall" inherent viscosity. Such "overall" viscosity is the sum of an inherent viscosity due to the linear portion of the polyester plus an inherent viscosity due to branched portions of the polyester. In a method for reproducibly preparing branched polyesters, the "overall" inherent viscosity at a given time in the preparation contains a component that is due solely to the branched portions of the polyester and is substantially the same from batch to batch at such given time.

Methods for reproducibly preparing branched polyesters have eluded workers in the art because of the inherent difficulty encountered in controlling the competing rates of linear extension and branching during the formation of such branched polyesters. Typically, for polyesters useful as films or fibers, the rate of linear extension during polycondensation is significantly greater than the rate of branching. When polycondensation is carried out under conventional conditions, that is, under conditions which "drive" the reaction to completion, this difference in rates is so great that little or no branching occurs. In general, the prior art methods compensate for this effect by using high concentrations of polyfunctional compounds for preparing branched polyesters. However, the use of high concentrations of polyfunctional compounds often results in undesirable gelation or crosslinking of the polyester.

Branched polyesters and methods for making them are known, as disclosed for example, in U.S. Pat. No. 3,576,773 (issued Apr. 27, 1971 to Vaginay) and British Pat. No. 1,027,613 (published Apr. 27, 1966). Typically, such methods use polyfunctional compounds which have three or more reactant functional radicals, such as hydroxyl and carboxyl radicals. These polyfunctional compounds are also known as branching agents. U.S. Pat. No. 4,013,624 (issued Mar. 22, 1977 to Hoeschele) relates to the preparation of high molecular weight branched copolyesters using a "critical" concentration of branching agent. This reference suggests that use of this concentration provides high molecular weight polyesters in the shortest possible time. But like the rest of the prior art, it lacks any teaching or suggestion of controlling polycondensation conditions in order to prepare branched polyesters reproducibly.

Hence, it would be desirable to have a method of preparing branched polyesters whereby one could practically reproduce branched polyesters having a pre-selected combination of properties. Further, it would be desirable to have such a method wherein the concentration of polyfunctional modifier would be varied in a wide range without fear of undesired gelation or crosslinking.

SUMMARY OF THE INVENTION

This invention provides a method for reproducible preparation of branched polyesters. This method enables one to avoid gelation or crosslinking in the preparation of a branched polyester even when a relatively high concentration of polyfunctional modifier is used. In general, this method involves controlling the competing rates of linear extension and branching which occur during polycondensation whereby the resulting branched polyesters have a desired amount of branching batch after batch.

More specifically, the method of this invention allows a worker skilled in polymer chemistry to prepare a branched polyester having a pre-selected inherent viscosity and other physical and chemical properties batch after batch.

In practicing the method of this invention, a condensation polymer is formed by reacting together a diol, a diacid and a polyfunctional modifier which has at least three functional radicals. This polymer is then polycondensed in the presence of a transesterification catalyst at a reaction temperature and reaction pressure effective to form a polyester by linear extension and branching. During polycondensation, the catalyst activity, temperature and pressure are correlated to restrain the extent of reaction for linear extension to within about 0.1 percent of the extent of reaction for branching.

BRIEF DESCRIPTION OF THE DRAWINGS

FIG. 1 is a graph prepared using known mathematical equations. It plots "theoretical"inherent viscosity as a function of extent of reaction for unbranched and branched poly(ethylene terephthalate) at concentrations of the polyfunctional modifier pentaerythritol ranging from 0 to 0.5 mole percent.

FIG. 2 is a graph prepared using known mathematical equations. It plots "theoretical" inherent viscosity as a function of extent of reaction for unbranched and branched polyesters prepared from ethylene glycol, dimethyl terephthalate, diethylene glycol and 1,4- cyclohexanedimethanol at different concentrations of the polyfunctional modifiers trimellitic anhydride and pentaerythritol.

In both figures, the term "theoretical" means that all functional groups of all reactants, including those on polyfunctional modifiers, react at the same rate at the indicated viscosity values.

DESCRIPTION OF THE PREFERRED EMBODIMENTS

In general, the practice of this invention comprises reacting together a diol, a diacid and a polyfunctional modifier to form a condensation polymer. Such materials are sometimes called polymer precursors. Conditions for condensation of such polymer precursors are known in the art. Typically, condensation occurs in the presence of a transesterification catalyst at a temperature in the range of from about 125° to about 300° C. Reaction pressure is typically in the range of from about 0.1 mm Hg to about one or more atmospheres. Condensation is generally continued for from about 30 to about 300 minutes or until the polymer has an inherent viscosity in the range of from about 0.4 to about 1.0. Unless otherwise stated herein, the inherent viscosities were determined in a mixture of 60:40 (percent, by weight) phenol:chlorobenzene at 25° C. and a concentration of 0.25 grams polymer per deciliter of solution. Low-molecular weight by-products of condensation, such as water, alcohols, glycols, acids and esters, are removed during condensation by distillation or another standard technique.

Generally, at least about 1.1 moles of diol are present for each mole of diacid, and preferably from about 1.3 to about 2 moles of diol are present for each mole of diacid. The concentration of polyfunctional modifier used in the reaction mixture is the concentration required to obtain a desired ratio of linearization to branching at a given inherent viscosity. This concentration can be conveniently determined by routine experimentation. Typically, such concentration is in the range of from about 0.001 to about 10 molar percent, preferably from about 0.1 to about 5 molar percent, and more preferably from about 0.1 to about 1 molar percent, based on moles of diacid. The concentration of polyfunctional modifier used will, of course, depend upon the number of functional groups in the modifier molecule. In general, the more functional groups a modifier has, the less modifier is needed to achieve a desired amount of branching. As is understood in the art, the chemical and physical properties of resulting branched polyesters can be varied by the use of different concentrations of polyfunctional modifier.

In practicing my invention, the polymer initially obtained from condensation of the polymer precursors is subsequently polycondensed to form a desired branched polyester. Polycondensation proceeds while correlating polycondensation conditions, i.e. catalyst activity, reaction temperature and reaction pressure, to restrain the extent of reaction for linear extension to within about 0.1 percent of the extent of reaction for branching. Preferably, the extent of reaction for linear extension is restrained to within about 0.05 percent of the extent of reaction for branching. Throughout this specification and in the claims, the term "correlating" means that one or more of the indicated polycondensation conditions are changed as required, to achieve an interrelationship among such conditions such that a restraint is placed upon the extent of reaction for the linear extension of polymer chains.

As known and understood in the art, extent of reaction refers to the fraction of polymer precursor molecules which have undergone reaction at a particular time in the polymerization. In other words, extent of reaction is a measure of the extent of completion of polycondensation. Extent of reaction is generally referred to in the art as "p".

Under conventional polycondensation conditions, the rate of linear extension is generally much greater than the rate of branching. It is believed that this difference in rates exists because the third and additional functional radicals on polyfunctional modifiers react more slowly than the first and second functional radicals on such modifiers or on bifunctional polymer precursors. Thus, control of polycondensation and the resulting reproducibility appear to depend upon slowing down the linear reaction so that the extent of reaction for linear extension at any given time during polycondensation is substantially equal to the extent of reaction for branching. That is, the extent of reaction for the linear extension is within about 0.1 percent of the extent of reaction for branching.

The practice of my invention can be illustrated in the following manner:

In the first step of the preparation, polymer precursors, including a polyfunctional modifier, such as pentaerythritol (at, e.g. 0.35 mole %), are reacted together to form a condensation polymer. Typical reaction conditions for this step are described herein. Condensation is completed when either a particular inherent viscosity is reached or condensation by-products are no longer being generated.

Upon completion of the condensation reaction, the resulting condensation polymer is polycondensed to form a branched polyester. Instead of polycondensing under conventional conditions which "drive" the linear polycondensation reaction forward rapidly, polycondensation is carried out under conditions which restrain the linear reaction to an appropriate degree, as described herein. Such restraining conditions include a decrease in catalyst activity, a decrease in temperature, an increase in pressure or any combination of such changes. The particular conditions employed in a specific instance will depend upon the specific branched polyester desired. These conditions can be conveniently determined with a reasonable amount of routine experimentation. Polycondensation is continued until the resulting branched polyester has a desired inherent viscosity.

When polycondensation is carried out under the described conditions whereby the rate of linear extension is substantially equal to the rate of branching, inherent viscosity can be plotted in graphical form as a function of extent of reaction. FIGS. 1 and 2 are examples of such graphical plots. These plots are prepared from standard equations which relate inherent viscosity to degree of polymerization and degree of polymerization to extent of reaction. The basis for use of these equations is an assumption that the functional groups on all polymer precursors for the branched polyester have equal reactivities. These equations and typical calculations using them are illustrated, for example, in Rafikov et al, "Determination of Molecular Weights and Polydispersity of High Polymers," 1964, Daniel Davey and Co., Inc., pp. 345–357; Gordon et al, *Proc. Roy. Soc.*, 191, 380–402 (1966); Gordon et al, *Trans Faraday Soc.*, 60, 604-621 (1964); Luby, *J. Polymer Sci.:Symposium No.* 53, 23-28 (1975); Flory, "Principles of Polymer Chemistry," 1953, Cornell Univ. Press, Ithaca, N.Y., p. 260; Lenz, "Organic Chemistry of Synthetic High Polymers," 1967, Interscience Publishers, Chapter 3; and Maneresi et al, *Polymer,* 17, pp. 595-600 (1976).

If an inherent viscosity is measured during the course of a polycondensation reaction in the practice of my invention, this measured, or "actual", inherent viscosity will be substantially equal (within ±0.04, and preferably within ±0.02 of each other) to a calculated, or "theoretical", inherent viscosity which can be determined by examining a graphical plot, such as in FIG. 1 or 2.

The relationship between an "actual" inherent viscosity and a calculated "theoretical" inherent viscosity is useful in confirming that the rate of linear extension in polycondensation has been effectively restrained. This desired restraint occurs when the the extent of reaction for linear extension is within about 0.1 percent of the extent of reaction for branching. Thus, an extent of reaction is determined for the "actual" inherent viscosity during the course of polycondensation, e.g. after 1.0 or 1.5 hours. This extent of reaction is determined from the appropriate graphical plot, e.g. FIG. 1 or 2. Using the same graphical plot, at the same extent of reaction, a "theoretical" inherent viscosity is determined for an unbranched polyester made under the same conditions as the corresponding branched polyester. This unbranched polyester is then prepared under those same conditions. After, for example, 1.0 or 1.5 hours of polycondensation, the "actual" inherent viscosity of the unbranched polyester is measured. If this "actual" inherent viscosity is substantially equal to the "theoretical" value for the same unbranched polyester, the relationships predicted by the graphical plots are true. By substantially equal, I mean the inherent viscosities are within ±0.04, preferably ±0.02, of each other, since this takes into account experimental error.

Branched and unbranched polyesters can also be characterized by polydispersity. Polydispersity is a measure of molecular weight distribution for a polyester. It can be determined by standard techniques, including gel permeation chromatography. Gel permeation chromatography is described, for example, in Bannister et al, *Analytical Chemistry,* Vol. 26, No. 9, 1954, pp. 1451-1454.

In brief the technique comprises passing a solution of polyester in a suitable solvent, such as N,N-dimethylformamide, through a tower packed with a molecular sieve type of absorption material. Polyester molecules are fractionated by being absorbed into the openings of the material in a distribution depending upon the sizes of the molecules. The smallest molecules are absorbed first whereas the largest molecules are absorbed last, or not at all. The number of molecules in each gradient of the column is measured and a number average (N.A.) is calculated. The molecular weights of the molecules in each gradient are measured by known methods, e.g. viscosity measurements, and a weight average (W.A.) is calculated. Polystyrene is used as a standard for comparison of its number average and weight average molecular weights with those obtained with the polyester being fractionated. The values for the polyester are then recorded as number average polystyrene equivalent molecular weight (N.A. PSEW) or weight average polystyrene equivalent molecular weight (W.A. PSEW). Polydispersity (PD) is then defined by the following equation:

$$PD = \frac{W.A.\ PSEW}{N.A.\ PSEW}$$

As known in the art, a polymer having a high weight average molecular weight and a low number average of different sized molecules will have a high polydispersity. Conversely, a polymer having the same high weight average molecular weight but a higher number average will have a lower polydispersity. Polydispersity can be used as a measure of the amount of branching in a polyester. Reproducibility is achieved if branched polyester polydispersity is substantially the same batch after batch with a branched polyester prepared under the same polycondensation conditions. If polydispersity varies significantly, say greater than ±1.0 (at a polydispersity up to 4.0), the extent of reaction for linear extension has not been sufficiently restrained to obtain reproducibility. At polydispersities greater than 4.0, reproducibility is achieved with variations greater than ±1.0.

Theoretically, a random homopolyester has a polydispersity of 2.0. In general, the branched polyesters prepared by the method of this invention have polydispersities in the range of from about 3 to about 50. The polydispersity, of course, can vary with the particular polyester made and use contemplated.

Branched polyesters are prepared by the method of this invention in the presence of one or more transesterification catalysts. Each catalyst can be characterized with both a second order rate constant per equivalent per liter at a given temperature and an energy of activation. For purposes of this invention, catalysts are also characterized as "highly reactive" or "poorly reactive". As used in this specification and in the claims, highly reactive catalysts are those having rate constants in the range of from about 0.1 to about 5, and preferably from about 0.5 to about 2.5 per equivalent-second at 190° C. These catalysts also generally have energies of activation in the range of from about 5 to about 35, and preferably from about 10 to about 20 kcal/mole. Poorly reactive catalysts are those having rate constants less than and energies of activation more than these values, respectively. Typical highly reactive catalysts include titanium, zinc and magnanese. Typical poorly reacive catalysts include antimony, sodium, magnesium, calcium and lithium.

Mixtures of catalysts can be used, including, for example, the mixtures of catalysts described in U.S. Pat. No. 3,806,468 (issued Apr. 23, 1974) and 3,830,759 (issued Aug. 10, 1974) both to me. Catalysts useful in the method of this invention are generally available in the form of organic or inorganic compounds, e.g. tetraisopropyl titanate, titanium dioxide, zinc acetate, zinc acetyl acetonate, calcium oxide, manganese oxide and the like. The acetates, chlorides, nitrates, sulfates, oxides and alkoxides of metals such as zinc, manganese, tin, titanium, antimony, cobalt and lithium are preferred. The catalyst is generally present in the reaction mixture in a concentration in the range of from about 0.01 to about 0.1 percent, and preferably from about 0.02 to about 0.06 percent, by weight, based on the total weight of polymer precursors. Buffering compounds, such as alkaline salts of organic acids, can be included with the catalysts if desired.

During polycondensation, catalyst activity, reaction temperature and pressure are correlated to restrain the extent of reaction for linear extension in the practice of this invention. Catalyst activity is generally controlled to restrain extent of reaction for linear extension thereby allowing reproducibility. This control can be exercised alone or accompanied by a change in temperature or pressure. Catalyst activity can be controlled by specifying the type and concentration of catalyst. For example, poorly reactive catalysts which slow the rate of linear extension can be used. Alternatively, the effectiveness of highly reactive catalysts can be reduced by adding end capping agents, poorly reactive polymer precursors, or catalyst "poisons" or deactivators.

End capping agents are also known as chain terminating agents. Exemplary end capping agents are disclosed in U.S. Pat. No. 2,895,946 (issued July 21, 1959 to Huffman) including, for example, monohydric polyalkylene oxides and polyalkylvinyl ethers each having one terminal hydroxyl radical. Poorly reactive polymer precursors include such materials as 1,2-propylene glycol, dimethyl o-phthalate, 1,2-butylene glycol, neopentyl glycol, 2,2-ethylbutyl-1,3-propanediol. These compounds are generally less readily added to the polyester chain because of steric hindrance or other characteristics which decrease their reactivity. Exemplary catalyst "poisons" or deactivators include phosphoric acid, tributylphosphate, phosphorous acid, trimethylphosphate, etc. The amount of end capping agent, poorly reactive precursor or catalyst "poison" added will vary depending upon the amount and type of catalyst used, the type of polymer precursors reacted, the amount of branching desired, whether temperature or pressure conditions are changed, etc. Typically, however, from about 0.1 to about 0.5 percent, by weight, of one or more of these materials is added, based on total polymer precursor weight. A moderate amount of experimentation may be useful to determine the optimum amount of catalyst "poison", poorly reactive precursor or end capping agent needed to achieve reproducibility.

A change in reaction temperature during at least part of the polycondensation can also be used to restrain linear extension in preparing branched polyesters. Typically, for melt polymerization, reaction temperature is lowered from that used in polymer condensation and maintained in the range of from about 120 to about 240° C. and preferably from about 200 to about 220° C. For solid phase polymerization, the temperature can be lowered to within the range of from about 120° C. to about 190° C., depending upon the normal polymerization temperature. The point is that the temperaure is lowered below that normally used to "drive" the polymerization reactions forward. Again, the specific temperature reduction depends upon many variables including temperatures at which the polyesters crystallize and can be determined for a given reaction with limited experimentation.

Reaction temperature can be increased as long as other reaction conditions, i.e. catalyst activity or pressure, are correlated with the increase to effect a restraint on linear extension. A change in temperature can be accompanied by a change in reaction pressure during at least part of the polycondensation. Generally, during polycondensation, pressure is maintained in the range of from about 5 to about 100 mm Hg and preferably from about 10 to about 50 mm Hg for melt polymerization reactions. The pressure can be higher for solid phase polymerization. In the practice of my invention, polycondensation pressure is generally higher than the pressures allowed in polycondensation procedures of the prior art. The reaction pressure can be changed while keeping other conditions unchanged. Typically, in solid phase polymerization, the reaction pressure is provided by the partial pressures of evolved reaction by-products, e.g. glycols. Regulation of these partial pressures corresponds to a regulation of reaction pressure needed to achieve restraint of linear extension.

The polymer precursors mixed together and reacted to form a condensation polymer in the practice of this invention include diols, diacids, and polyfunctional modifiers. As used throughout this specification and in the claims, the terms "a diol", "a diacid" and "a polyfunctional modifier" include a mixture of diols, a mixture of diacids and a mixture of polyfunctional modifiers, respectively.

Diols useful in the practice of this invention are typically dihydric alcohols or functional derivatives thereof, such as esters, which are capable of condensing with diacids or their functional derivatives to form condensation polymers. These diols can be represented, for example, by the formula $RO-R^1-OR^2$ wherein each of R and $R^2$ is hydrogen or alkylcarbonyl, preferably of from 2 to 7 carbon atoms, and $R^1$ is an aliphatic, alicyclic or aromatic radical, preferably of from 2 to 12 carbon atoms and including carbon and hydrogen atoms, and optionally, oxygen atoms. An alkylcarbonyl can be represented by the formula

wherein R'' is alkyl preferably of from 1 to 6 carbon atoms. Representative alkylcarbonyl radicals are acetyl, propionyl, butyryl, etc. More preferably, each of R and $R^2$ is hydrogen.

$R^1$ is an aliphatic, alicyclic or aromatic radical, preferably of 2 to 12 carbon atoms and more preferably of 2 to 6 carbon atoms. Typical aliphatic, alicyclic and aromatic radicals include alkylene, cycloalkylene, alkylidene, arylene, alkylidyne, alkylenearylene, alkylenecycloalkylene, alkylenebisarylene, cycloalkylenebisalkylene, arylenebisalkylene, alkylene-oxy-alkylene, alkylene-oxy-arylene-oxyalkylene, etc. Preferably, $R^1$ is hydrocarbon, such as alkylene, cycloalkylene, cycloalkylenebisalkylene or arylene.

Exemplary diols useful in the practice of this invention includes ethylene glycol, diethylene glycol, triethylene glycol, 1,3-propanediol, 1,4-butanediol, 2-methyl-1,5-pentanediol, neopentyl glycol, 1,4-cyclohexanedimethanol, 1,4-bis(β-hydroxyethoxy)-cyclohexane, quinitol, norcamphanediols, 2,2,4,4-tetraalkylcyclobutane-1,3-diols, p-xylene glycol, and corresponding alkyl esters thereof.

Diacids useful in the practice of this invention are typically dicarboxylic acids or functional derivatives thereof, such as esters, acid halides or anhydrides, which are capable of condensing with diols or their functional derivatives to form condensation polymers. These diacids can be represented, for example, by the formula

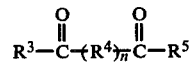

wherein n is 0 or 1, each of $R^3$ and $R^5$ is hydroxy, halogen, e.g. fluoro, chloro, etc., or alkoxy, preferably of from 1 to 12 carbon atoms, such as methoxy, ethoxy, t-butoxy etc., or $R^3$ and $R^5$ taken together form an oxy linkage, and $R^4$ is an aliphatic, alicyclic or aromatic radical, preferably of from 1 to 12 carbon atoms and including carbon and hydrogen atoms and, optionally, oxygen atoms. More preferably, each of $R^3$ and $R^5$ is hydroxy or alkoxy of 1 to 4 carbon atoms.

$R^4$ is an aliphatic, alicyclic or aromatic radical, preferably of 1 to 12 carbon atoms. The definition of $R^1$ given hereinbefore applies here as well for $R^4$. Preferably, $R^4$ is hydrocarbon, such as alkylene, cycloalkylene or arylene.

Exemplary diacids which are useful in the practice of this invention include sebacic acid, 1,4-cyclohexanedicarboxylic acid, adipic acid, glutaric acid, succinic acid, carbonic acid, oxalic acid, azelaic acid, 4-cyclohexane-1,2-dicarboxylic acid, 2-ethylsuberic acid, 2,2,3,3-tetramethylsuccinic acid, 4,4'-bicyclohexyldicarboxylic acid, terephthalic acid, isophthalic acid, dibenzoic acid, bis(p-carboxyphenyl)-methane, 1,5-naphthalenedicarboxylic acid, phenanthrene dicarboxylic acid, 4,4'-sulfonyldibenzoic acid and other similar acids including those disclosed, for example, in U.S. Pat. No. 3,546,180 (issued Dec. 8, 1970 to Caldwell), U.S. Pat. No. 3,929,489 (issued Dec. 30, 1975 to Arcesi et al) and U.S. Pat. No. 4,101,326 (issued July 18, 1978 to me). Alkyl ester, acid halide and anhydride derivatives of these acids are also useful in the practice of this invention.

Polyfunctional modifiers useful in the practice of this invention are also known as branching agents. These modifiers contain three or more functional radicals, such as hydroxyl or carboxyl radicals or functional derivatives thereof, such as esters and anhydrides. Exemplary modifiers include polyols having three or more hydroxyl radicals, polycarboxylic acids having three or more carboxyl radicals and hydroxy acids having three or more hydroxyl and carboxyl radicals. As used in this specification and in the claims, the terms "polycarboxylic acid" and "hydroxy acid" also include functional equivalents, such as anhydrides and esters.

Representative polyfunctional modifiers are trimesic acid, trimellitic acid, trimellitic anhydride, pyromellitic acid, butanetetracarboxylic acid, naphthalenetricarboxylic acids, cyclohexane-1,3,5-tricarboxylic acid, glycerol, trimethylolpropane, pentaerythritol, dipentaerythritol, 1,2,6-hexanetriol, 1,3,5-trimethylolbenzene, malic acid, citric acid, 3-hydroxyglutaric acid, 4-$\beta$-hydroxyethylphthalic acid, 2,2-dihydroxymethylpropionic acid, 10,11-dihydroxyundecanoic acid, 5-(2-hydroxyethoxy)-isophthalic acid and others known in the art as disclosed, for example, in U.S. Pat. No. 4,013,624 (issued Mar. 22, 1977 to Hoeschele). Preferred polyfunctional modifiers include modifiers having three or four functional radicals, such as trimellitic anhydride and pentaerythritol.

The method of this invention is useful as applied to both melt and solid phase polycondensation techniques. The details for using these techniques are known in the art.

The branched polyesters prepared by this method can also contain various stabilizers, anti-oxidants, fillers, pigments, ultraviolet radiation absorbers, plasticizers and other addenda known to be useful in polyesters as disclosed, for example, in U.S. Pat. No. 4,101,326 (issued July 18, 1978 to me). Branched polyesters are useful in a variety of products including, for example, photographic film supports, molded articles, fibers, adhesives, electrophotographic toners, lacquers, etc. The advantage of the method of this invention is that the method allows one to reproducibly make branched polyesters having particular properties for particular uses.

The method of this invention is further illustrated by the following examples of its practice.

EXAMPLE 1

As discussed hereinabove, it is conventional to prepare branched polyesters using reaction conditions during polycondensation which "drive" the linear polymerization reaction forward. Very little branching occurs under such conditions because the reaction of more reactive linear functional groups prevails. In the methods of the prior art, there is no attempt to correlate the reaction conditions to restrain the extent of reaction for linear extension. For example, in a conventional preparation of branched polyesters, polycondensation is carried out at a temperature which is at least as high or higher than that used in the condensation stage, at a lower pressure and which unchanged catalyst activity.

In practicing my invention, reaction conditions, e.g. temperature, pressure and catalyst activity, are correlated to restrain the extent of reaction for linear extension. In this example, the rate of linear extension is restrained by polycondensing at a pressure greater than that typically used for conventional polycondensation. In conventional polycondensation, the reaction pressure is kept very near vacuum in order to "drive" the polycondensation reaction forward.

A branched polyester was prepared by the following procedure:

CONDENSATION STEP

Dimethyl terephthalate (388 g, 2 moles), ethylene glycol (188 g, 3 moles), cyclohexanedimethanol (89 g, 0.6 mole), diethylene glycol (21 g, 0.2 mole) and pentaerythritol (6.8 g, 0.05 mole, 2.5 mole %) were reacted in the presence of tetraisopropyltitanate catalyst (0.45 g). The reaction was carried out at 252° C. for about 100 minutes at atmospheric pressure.

POLYCONDENSATION STEP

The resulting condensation polymer was then polycondensed in the melt phase in the same reactor at 252° C. and 40 mm Hg for 110 minutes. The resulting branched polyester had an inherent viscosity of 0.45 and a polydispersity of 10.4.

From the graphical plots of FIG. 2, it was determined that the extent of reaction for a branched polyester having an inherent viscosity of 0.45 and prepared with 2.5 mole % pentaerythritol is about 0.958. This same graphical plot shows that at such extent of reaction, the reaction conditions used to prepare the branched polyester should provide an unbranched polyester having an inherent viscosity of 0.21. This follows only if the polycondensation reaction conditions have been correlated according to this invention to restrain the extent of reaction for linear extension to within about 0.1% of the extent of reaction for branching.

PREPARATION OF UNBRANCHED POLY(ETHYLENE TEREPHTHALATE)

An unbranched polyester was prepared using the same materials and procedure in this Example for a branched polyester except that pentaerythritol was omitted. After 110 minutes of polycondensation, the inherent viscosity of the polyester was about 0.18. This value is substantially equal to the value of 0.21 predicted from the graphical plot of FIG. 2.

EXAMPLE 2

The following comparative example illustrates polyester preparation wherein no attempt was made to restrain linear extension during polycondensation.

Condensation Step

Dimethyl terephthalate (388 g, 2 moles), ethylene glycol (188 g, 3 moles), cyclohexanedimethanol (89 g, 0.6 mole), diethylene glycol (21 g, 0.2 mole) and trimellitic anhydride (19.2 g, 0.1 mole, 5 mole %) were reacted in the presence of tetraisopropyltitanate catalyst (0.45 g). The reaction was carried out at 252° C. and atmospheric pressure for about 100 minutes.

Polycondensation Step

The resulting condensation polymer was then polycondensed at 251° C. for about 325 minutes. The reaction rate was very slow, so the pressure was reduced to 0.8 mm Hg for 30 minutes to promote reaction. No attempt was made to restrain linearization during this final stage of reaction. The resultant branched polyester had an inherent viscosity of 0.47 and a polydispersity of 3.02.

Referring to the graphical plots of FIG. 2, I determined the extent of reaction for this branched polyester to be about 0.959. From this same Figure, at this same extent of reaction, the inherent viscosity for unbranched polyester was determined to be about 0.22. An unbranched polyester was not made in this procedure. However, a comparison of this polyester can be made with the branched polyester of Example 1. That comparison indicates that little branching occurred in this polycondensation. The branched polyester of Example 1 had an inherent viscosity of 0.45 and a polydispersity of 10.4. The supposedly branched polyester of this procedure had a similar inherent viscosity (0.47), but a markedly different polydispersity of 3.02. This low polydispersity indicates that very little branching occurred (a polydispersity of 2.0 indicates no branching). Most of the inherent viscosity must then be due to linearization rather than branching. How much of the 0.47 value, of course, is not known, but it is believed that the portion due to linearization is much greater than 0.22, the inherent viscosity determined from the graphical plots of FIG. 2. Promoting reaction during the last 30 minutes of polycondensation by reducing the pressure allowed linearization to occur while essentially inhibiting the branching reaction.

EXAMPLE 3

This example illustrates that the rate of linear extension is restrained by lowering polycondensation reaction temperature below the temperature used in the condensation stage and in conventional polycondensation.

Branched poly(ethylene terephthalate) was prepared by the following procedure:

Condensation Step

Dimethyl terephthalate (388 g, 2 moles), ethylene glycol (248 g, 4 moles) and pentaerythritol (0.95 g, 0.007 moles, 0.35 mole %) were reacted in the presence of a catalyst mixture of lithium acetate dihydrate (14 ppm Li), zinc acetate dihydrate (65 ppm Zn), cobalt acetate tetrahydrate (20 ppm Co), manganese acetate tetrahydrate (55 ppm Mn), tetraisopropyltitanate (12 ppm Ti) and antimony oxide (325 ppm Sb). The reaction was carried out at atmospheric pressure and 270° C. for 95-100 minutes. The resulting condensation polymer had an inherent viscosity of 0.37.

Polycondensation Step

Samples of the condensation polymer were subsequently polycondensed in a conventional six-stage fluidized solid phase reactor at several temperatures and 1 mm Hg for times up to 120 minutes at a rate of about 1.4 kg/hr. Table I below lists the resulting "actual" inherent viscosities for each branded polyester.

From the graphical plots of FIG. 1, an extent of reaction was determined for the branched polyester at each "actual" inherent viscosity value. At each such extent of reaction, a "theoretical" inherent viscosity was then determined for unbranched polyester prepared under the same set of conditions. These values of "theoretical" inherent viscosity were also recorded in Table I below.

Unbranched poly(ethylene terephthalate) was prepared using the same materials and procedure described in this example for the branched polyester except that pentaerythritol was omitted. Table I below lists the "actual" inherent viscosities determined for samples taken during polycondensation.

Table I

| Polycondensation Temperatures | Polycondensation Time (min) | Inherent Viscosity | | |
|---|---|---|---|---|
| | | Branched PET (actual) | Unbranched PET (actual) | Unbranched PET (theoretical) |
| 170° C. | 30 | .36 | .36 | .32 |
| | 60 | .40 | .38 | .35 |
| | 90 | .49 | .43 | .41 |
| | 120 | .52 | .45 | .43 |
| 180° C. | 30 | .38 | .38 | .34 |
| | 60 | .41 | .40 | .36 |
| | 90 | .49 | .42 | .41 |
| | 120 | .54 | .48 | .45 |
| 190° C. | 30 | .41 | .40 | .36 |
| | 60 | .55 | .46 | .45 |
| | 90 | .76 | .51 | .59 |
| | 120 | .93 | .54 | >.60** |
| 210° C. | 30 | .69 | .51 | .55 |
| | 60 | *— | .60 | |
| | 90 | *— | .69 | |
| | 120 | *— | .69 | |

*sample insoluble in solvent (phenol-chlorobenzene mixture)
**approximated value from extrapolation of curves in FIG. 1

Solid phase polymerization is typically carried out at a temperature above about 200° C. It is apparent from the results listed in Table I above, that lowering the polycondensation temperature restrains the rate of linear extension. As the temperature is lowered further, greater restraint is achieved at longer polycondensation times.

This invention has been described in detail with particular reference to certain preferred embodiments thereof, but it will be understood that variations and modifications can be effected within the spirit and scope of the invention.

I claim:
1. In a method of preparing a branched polyester comprising:
   (1) forming a condensation polymer by reacting together

(a) a diol;
(b) a diacid; and
(c) a polyfunctional modifier having at least three functional radicals; and
(2) polycondensing said polymer in the presence of a transesterification catalyst at a reaction temperature and reaction pressure effective to form a polyester by linear extension and branching, the improvement comprising polycondensing said polymer while correlating the activity of said catalyst, said temperature and said pressure to restrain the extent of reaction for said linear extension to within about 0.1 percent of the extent of reaction for said branching.

2. The method of claim 1 wherein said polycondensing is in melt phase.

3. The method of claim 1 wherein said polycondensing is in solid phase.

4. The method of claim 1 wherein said reaction temperature is lowered and maintained at about 180° to about 240° C. during at least a part of said polycondensing.

5. The method of claim 1 wherein said reaction pressure is raised and maintained at about 5 to about 100 mmHg during at least a part of said polycondensing.

6. The method of claim 1 wherein the activity of said catalyst is decreased prior to completing said polycondensing.

7. In a method of preparing a branched polyester comprising:
(1) forming a condensation polymer by reacting together
  (a) a diol of the formula $RO-R^1-OR^2$ wherein each of R and $R^2$ is hydrogen or alkylcarbonyl and $R^1$ is an aliphatic, alicyclic or aromatic radical;
  (b) a diacid of the formula

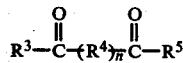

wherein n is 0 or 1, each of $R^3$ and $R^5$ is hydroxy, halogen or alkoxy or $R^3$ and $R^5$ together form an oxy linkage, and $R^4$ is an aliphatic, alicyclic or aromatic radical; and (c) a polyfunctional modifier having at least three functional radicals; and
(2) polycondensing said polymer in the presence of a transesterification catalyst at a reaction temperature and a reaction pressure effective to form a polyester by linear extension and branching, the improvement comprising polycondensing said polymer while correlating the activity of said catalyst, said temperature and said pressure to restrain the extent of reaction for said linear extension to within about 0.1 percent of the extent of reaction for said branching.

8. The method of claim 7 wherein said reaction temperature is lowered and maintained at about 180° to about 240° C. during at least a part of said polycondensing.

9. The method of claim 7 wherein said reaction pressure is raised and maintained at about 5 to 100 mmHg during at least a part of said polycondensing.

10. The method of claim 7 wherein the activity of said catalyst is decreased prior to completing said polycondensing.

11. The method of claim 7 wherein said catalyst is a highly reactive transesterification catalyst.

12. The method of claim 7 wherein said catalyst is a poorly reactive transesterification catalyst.

13. The method of claim 7 wherein $R^1$ is hydrocarbon.

14. The method of claim 13 wherein $R^1$ is alkylene, cycloalkylene, cycloalkylenebisalkylene or arylene and each of R and $R^2$ is hydrogen.

15. The method of claim 7 wherein $R^4$ is hydrocarbon.

16. The method of claim 15 wherein $R^4$ is alkylene, cycloalkylene or arylene and each of $R^3$ and $R^5$ is hydroxy or alkoxy.

17. The method of claim 7 wherein said polyfunctional modifier is a polyol, polycarboxylic acid or hydroxy acid.

18. The method of claim 7 wherein said polyfunctional modifier has three or four functional radicals.

19. The method of claim 18 wherein said polyfunctional modifier is trimellitic anhydride or pentaerythritol.

20. The method of claim 7 wherein aid polyol, polycarboxylic acid or hydroxy acid is present in a concentration in the range of from about 0.1 to about 10 molar percent based on diacid.

* * * * *

UNITED STATES PATENT AND TRADEMARK OFFICE
CERTIFICATE OF CORRECTION

PATENT NO. : 4,217,440
DATED : August 12, 1980
INVENTOR(S) : Kenneth T. Barkey

It is certified that error appears in the above—identified patent and that said Letters Patent is hereby corrected as shown below:

Column 6, line 35, "per liter" should read -- -sec. --.

Column 12, line 16, "branded" should read -- branched --.

Signed and Sealed this

Eleventh Day of November 1980

[SEAL]

*Attest:*

SIDNEY A. DIAMOND

*Attesting Officer*  *Commissioner of Patents and Trademarks*